(12) United States Patent
Hahn et al.

(10) Patent No.: US 11,815,128 B2
(45) Date of Patent: Nov. 14, 2023

(54) BALL JOINT

(71) Applicant: ZF Friedrichshafen AG, Friedrichshafen (DE)

(72) Inventors: Michael Hahn, Osnabrück (DE); Wolfgang Eulerich, Osnabrück (DE); Manfred Heidemann, Belm-Vehrte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 202 days.

(21) Appl. No.: 17/296,815

(22) PCT Filed: Nov. 5, 2019

(86) PCT No.: PCT/EP2019/080144
§ 371 (c)(1),
(2) Date: May 25, 2021

(87) PCT Pub. No.: WO2020/114694
PCT Pub. Date: Jun. 11, 2020

(65) Prior Publication Data
US 2022/0003266 A1    Jan. 6, 2022

(30) Foreign Application Priority Data
Dec. 4, 2018   (DE) .................. 10 2018 220 954.5

(51) Int. Cl.
*F16C 11/06* (2006.01)
*F16C 11/10* (2006.01)

(52) U.S. Cl.
CPC .......... *F16C 11/0638* (2013.01); *F16C 11/10* (2013.01); *F16C 2226/80* (2013.01)

(58) Field of Classification Search
CPC ... F16C 11/06; F16C 11/0619; F16C 11/0623; F16C 11/0628; F16C 11/0633;
(Continued)

(56) References Cited

U.S. PATENT DOCUMENTS 3,089,718 A * 5/1963 Gottschald .......... F16C 11/0609
                                                          403/131
3,999,870 A   12/1976 Clark et al.
(Continued)

FOREIGN PATENT DOCUMENTS

DE    195 42 071 A1    5/1997
DE    102005019557 A1 * 11/2005    .......... F16C 11/0638
(Continued)

OTHER PUBLICATIONS

German Office Action Corresponding to 10 2018 220 954.5 dated Jan. 24, 2020.
(Continued)

*Primary Examiner* — Jonathan P Masinick
(74) *Attorney, Agent, or Firm* — Finch & Maloney PLLC

(57) ABSTRACT

A ball joint, in particular a chassis joint, which has a housing and a ball socket that comprises a ball bearing section for receiving a joint ball. An anti-rotation member prevents movement of the ball socket within the housing. To improve operational performance of the ball joint, the anti-rotation member is formed by a connecting element of the housing and a mating connecting element of the ball socket. The connecting elements have corresponding holding profiles so that, in an assembled condition, the connecting elements form a shape-enclosing plug-in connection.

12 Claims, 3 Drawing Sheets

(58) Field of Classification Search
CPC .............. F16C 11/0638; F16C 11/0642; F16C 11/0685; F16C 11/069; F16C 2226/80; Y10T 403/32631; Y10T 403/32737
See application file for complete search history.

(56) References Cited

U.S. PATENT DOCUMENTS

| | | | | |
|---|---|---|---|---|
| 4,695,181 | A * | 9/1987 | Rahmede | F16C 11/0638 403/135 |
| 5,427,467 | A | 6/1995 | Sugiura | |
| 5,752,780 | A | 5/1998 | Dorr | |
| 7,040,833 | B2 * | 5/2006 | Kondoh | F16C 11/0642 403/135 |
| 7,144,182 | B1 * | 12/2006 | Jordan | F16C 11/0633 403/126 |
| 7,686,530 | B2 | 3/2010 | Schilz et al. | |
| 7,985,034 | B2 | 7/2011 | Ruste et al. | |
| 9,541,124 | B2 * | 1/2017 | Gräber | F16C 11/0652 |
| 10,066,661 | B2 * | 9/2018 | Kim | F16C 11/0685 |
| 10,415,633 | B2 * | 9/2019 | Kuroda | F16C 11/0647 |
| 11,460,068 | B2 * | 10/2022 | Kuroda | F16C 11/0638 |
| 11,542,981 | B2 * | 1/2023 | Doherty | F16C 11/0647 |
| 2003/0077114 | A1 | 4/2003 | Bröker | |
| 2007/0274770 | A1 | 11/2007 | Sagisaka et al. | |
| 2018/0163775 | A1 * | 6/2018 | Gräber | F16C 11/069 |
| 2019/0070920 | A1 | 3/2019 | Kuroda | |
| 2019/0390706 | A1 * | 12/2019 | Gräber | F16C 11/0638 |

FOREIGN PATENT DOCUMENTS

| | | | |
|---|---|---|---|
| DE | 10 2006 057 557 A1 | 6/2008 | |
| DE | 102009031284 A1 * | 1/2011 | ......... F16C 11/0642 |
| DE | 11 2005 000 333 B4 | 11/2017 | |
| EP | 0 591 928 A1 | 4/1994 | |
| WO | 2017/159458 A1 | 9/2017 | |

OTHER PUBLICATIONS

International Search Report Corresponding to PCT/EP2019/080144 dated Feb. 20, 2020.
Written Opinion Corresponding to PCT/EP2019/080144 dated Feb. 20, 2020.

* cited by examiner

BALL JOINT

This application is a National Stage completion of PCT/EP2019/080144 filed Nov. 5, 2019, which claims priority from German patent application serial no. 10 2018 220 954.5 filed Dec. 4, 2018.

FIELD OF THE INVENTION

The present invention relates to a ball joint, in particular a chassis joint, with a housing and a ball socket which, to receive a joint ball has a ball bearing section, and anti-rotation means which prevents any movement of the ball socket within the housing.

BACKGROUND OF THE INVENTION

Such ball joints are known from the prior art and are used in particular for the movable fitting of chassis components. To ensure the permanent mobility of the chassis components, the ball sockets are fitted into the housing in a rotationally fixed manner, in order on the one hand to prevent them from rotating and thereby at least partially blocking the joint aperture, and on the other hand to avoid increased wear. For this, according to the prior art a number of alternative possibilities are available.

For example ball joints are known, whose ball sockets are anchored in the housing by means of coupling rods. Furthermore interlocking connections are known, which are arranged laterally on the ball sockets and are usually of cylindrical shape so that they can be inserted by milling methods. Moreover grooves or nipples are known, which are attached to connecting components and which deform the surfaces of the ball socket during assembly and increase the clamping within the housing. Finally, small and in most cases embossed elements are known, which form a type of burr and press into the outer surface of the ball sockets during assembly.

The previous methods for preventing the rotation of ball sockets can have a direct effect on the contact surface area and therefore on the ball bearing section of the ball sockets. In particular, varying wall thicknesses in the ball bearing sections sometimes result in different thermal expansions, and this often reduces the operational performance of the joint.

SUMMARY OF THE INVENTION

Starting from there the purpose of the present invention is to propose a ball joint, in particular a chassis joint, with improved operational performance. In particular the contact surface of the ball socket should be increased and the performance of the joint should be substantially independent of the temperature.

This objective is achieved by a ball joint according to the independent claim(s). According to the invention it is provided that to prevent rotation the housing and the ball socket each comprises at least one connecting element, with corresponding holding profiles, so that in the assembled condition the connecting elements form an interlocking plug-in connection. In that way there is essentially a separation between the anti-rotation means or the connecting elements that form the anti-rotation means and the ball bearing section that forms the area of the contact surface of the joint ball within the ball joint. Accordingly, there is no need for additional fixing elements, which would otherwise result in irregular wall thicknesses of the ball bearing section. This maximizes the contact surface area of the ball socket, reduces the influence of temperature by virtue of homogeneous thermal expansion and reduces wear phenomena on the ball socket. All in all, the operational performance of the ball joint can be substantially improved thereby.

Preferred embodiments of the present invention are described below and in the subordinate claims.

For the ball bearing section to allow positioning of the joint ball which is decoupled from and thus independent of and uninfluenced by the connecting elements, according to a first preferred embodiment of the invention it is provided that the ball bearing section completely surrounds the connecting element of the ball socket, in such manner that the connecting element is preferably arranged around the central longitudinal axis of the ball joint. To put it differently, it is provided that relative to the geometrical mid-point of the ball joint, the connecting element of the ball socket is located within a cone angle $\alpha$ and the ball bearing section is outside the cone angle $\alpha$, so that the connecting element and the ball bearing section are an angular distance apart from one another. Preferably, the connecting element is arranged coaxially with the central axis (vertical axis), the central longitudinal axis being perpendicular to the equatorial plane of the ball socket and passing through its mid-point. This results in a direct separation of the anti-rotation means and the ball bearing section, so that neither affects the other in its respective function.

In order to obtain homogeneous support and positioning of the joint ball within the ball socket in all directions, in a preferred embodiment of the invention it is provided that the ball bearing section is made rotationally symmetrical relative to the central longitudinal axis of the ball joint, so the ball bearing section is designed without slots and without grooves.

According to a further preferred embodiment it is provided that the connecting element of the ball socket is designed as a positive shape and the connecting element of the housing as a negative shape. In particular it is provided that the ball socket comprises a cylindrically shaped connecting element with external holding profiles which can be inserted into a connecting element of the housing in the form of a correspondingly shaped cylindrical recess, which also has holding profiles formed on the cylindrical inside of the negative shape. As corresponding holding profiles of the connecting elements, it has been found preferable to have hexagonal or six-point rounded star-shaped holding profiles, or ones which have slot-shaped, cross-shaped or polygonal cross-sections.

If necessary, however, the connecting elements can also be of inverted design so that the connecting element of the ball socket is the negative shape and the connecting element of the housing is the corresponding positive shape. According to a preferred embodiment it is also provided if needs be that the connecting element is designed with a shape differing from a cylindrical shape and has an outer contour essentially shaped like a truncated cone, so that the connecting element also has a centering function. In that case the connecting element of the housing is of correspondingly conical shape.

In order to decouple the anti-rotation means even more effectively, it is preferably provided that on the outside of the ball socket a recess is formed, which completely surrounds the connecting element of the ball socket and in which, in the assembled condition, the housing engages with a correspondingly shaped raised annular ridge, the recess preferably having a U-shaped cross-section. The annular ridge of the housing on the side facing toward the ball bearing section is preferably designed to be a contact surface. In that way the ball bearing section, in the event of forces acting in the direction of the anti-rotation means, can be supported against the contact surface of the housing, where in any case small forces act upon the anti-rotation means. When the ball joint is subjected to large compression loads, the contact surface hardly allows any distortion of the plastic material of the ball socket and supports the deformed material, so that it cannot be distorted in less severely loaded areas and the joint tension reduced thereby.

Furthermore, by virtue of the annular cross-section taper a homogeneous material with few material defects is obtained in the ball bearing section, which can be attributed to the production method of the ball socket. The ball sockets according to the invention are preferably made by the injection molding process, wherein the plastic material in a suitable form is first injected in the area of the later anti-rotation feature. Thereafter, the plastic material penetrates through the cross-section taper into the area of the ball bearing section. The cross-section taper acts as a kind of throttle so that behind the cross-section taper a pressure drop is produced and the plastic relaxes, which results in a slow-down of the injection process and in uniform filling of the ball bearing section. Particularly in the area of the ball bearing section, ball sockets made in that way have few material defects, especially no flow lines or cavities.

In order to enlarge the contact area of the ball sockets still further, it is preferably provided that from the connecting element of the ball socket to a joint aperture of the ball joint the ball bearing section has a smoothly decreasing wall thickness. In the case when an annular recess is arranged between the connecting element and the ball bearing section, it is preferably provided that the ball bearing section has a smoothly decreasing wall thickness from the annular recess to the joint aperture of the ball joint.

Before assembly, the ball socket is essentially cylindrical or quasi-cylindrical from the opening area to the equator, so that a joint ball can be inserted into the ball socket. Furthermore an annular closing element is provided, which in the assembled condition deforms the cylindrical portion of the ball socket in such manner that the ball socket surrounds the joint ball in a shape-enclosing manner. In that way the ball bearing section is pressed against the joint ball uniformly and can then be held in the housing of the ball joint in a shape-enclosing manner.

BRIEF DESCRIPTION OF THE DRAWINGS

Below, specific embodiments of the present invention are explained in greater detail with reference to the figures, which show.

DETAILED DESCRIPTION OF THE PREFERRED EMBODIMENTS

Figure 1:
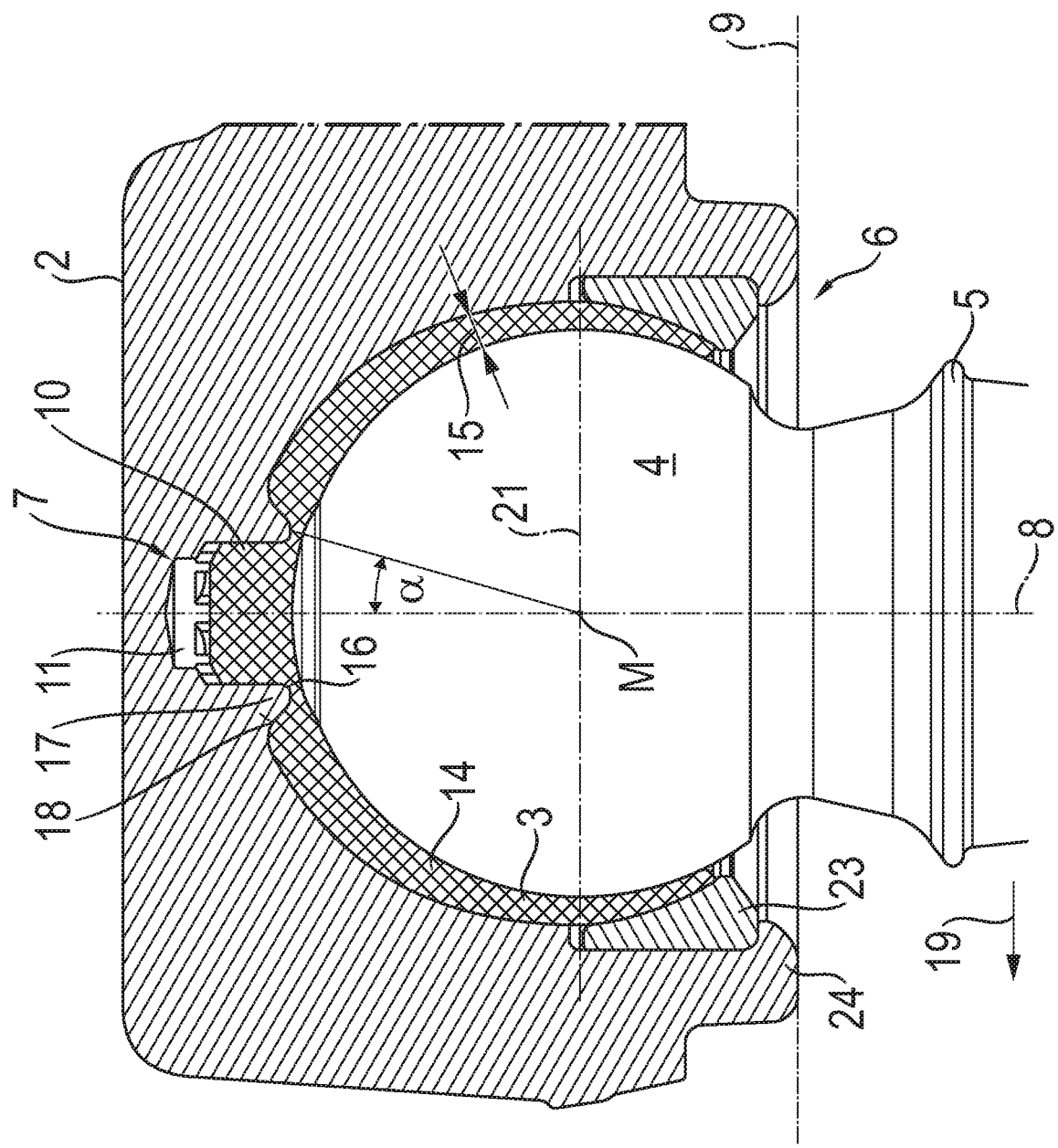
FIG. 1: A cross-sectional representation of a ball joint.
Figure 3A:
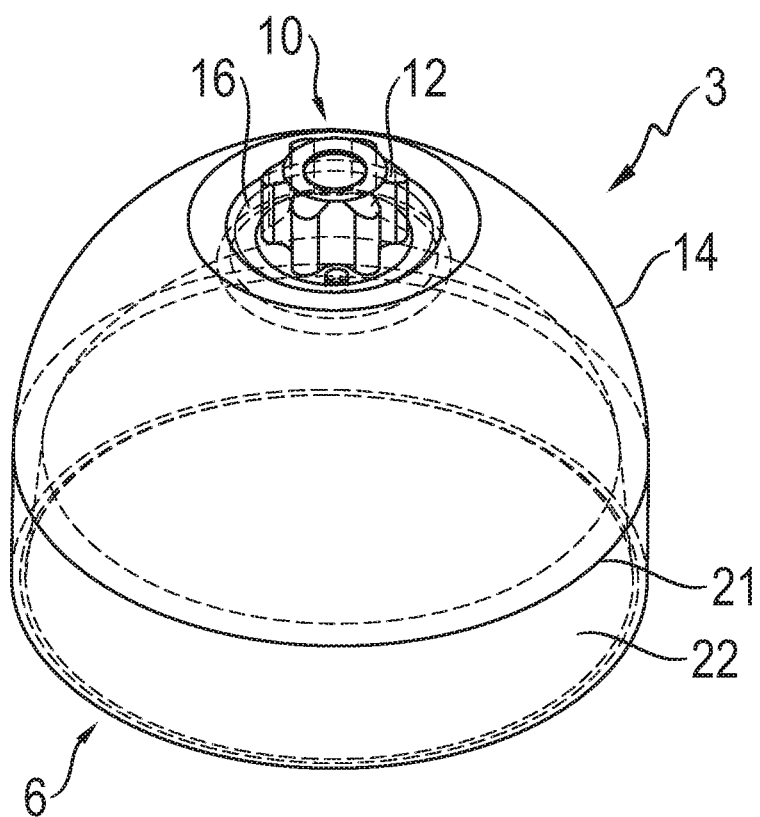
FIGS. 3a, 3b: Perspective representations of a ball socket and of a housing.
Figure 3B:
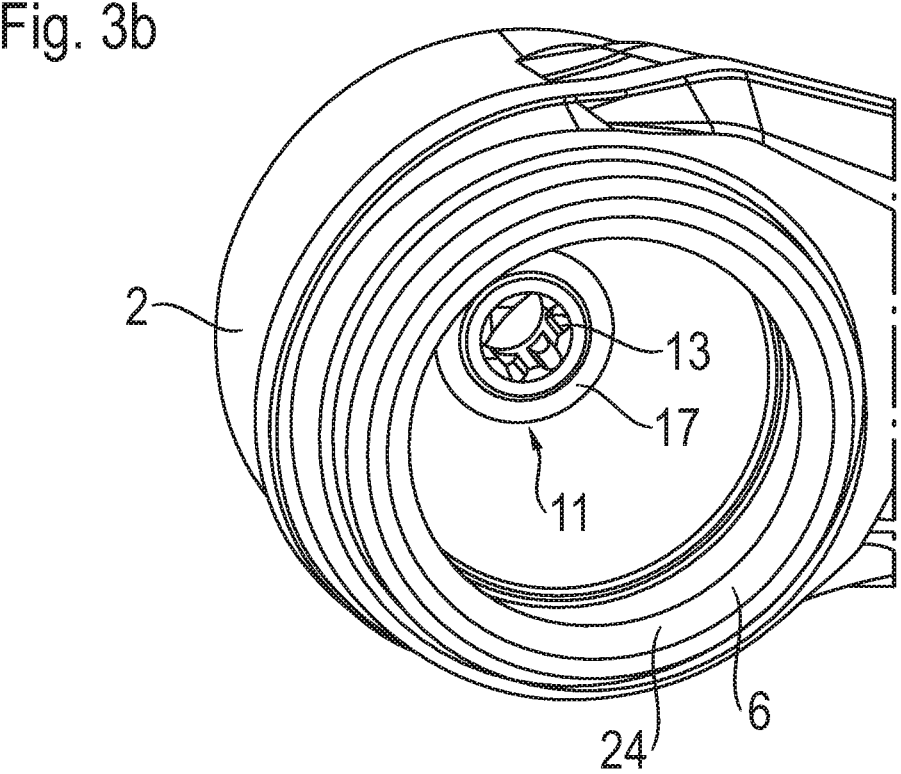

FIG. 1 shows a specific design of the ball joint 1 in the assembled condition, with a housing 2, a ball socket 3 and a joint ball 4 fitted therein, which extends through the ball socket 2 with a shank 5 at a joint aperture 6. The ball socket 3 is connected to the housing 2 by anti-rotation means 7, which prevent any movement of the ball socket 3 within the housing 2, in particular any rotation about the central longitudinal axis 8 (vertical axis), which is arranged perpendicularly to a plane 9 of the joint aperture 6 or the equator 21 of the ball socket 3 and passes through the mid-point M of the ball socket 3. In the example embodiment shown, the anti-rotation means 7 consists of a connecting element 10 on the ball socket 3, which is designed as a positive shape, and a correspondingly designed connecting element 11 of the housing 2, which is designed as a negative shape. Both connecting elements are of cylindrical design and, on their respective cylindrical outer and cylindrical inner surfaces, they have holding profiles (not shown in FIG. 1). In this connection, the example embodiments of FIGS. 3a, 3b show on the ball socket 3 a holding profile 12 with an outer six-point rounded star, and on the housing 2 a holding profile 13 with an inner six-point rounded star. In the assembled condition a connecting element 10, 11 designed in such manner blocks any movement of the ball socket 3 within the housing 2, in particular any rotation of the ball socket 3 about the central longitudinal axis 8 of the ball joint 1.

The connecting element 10 of the ball socket 3 is surrounded by a ball bearing section 14, so that there is a separation between the anti-rotation means 7 or the connecting element 10 and the ball bearing section 14. To be specific, with reference to the mid-point M of the ball socket 3 it is provided that the anti-rotation means 7 is arranged within the cone angle α. In that way the ball bearing section 14 can be made completely rotationally symmetrically with a constant wall thickness 15 as viewed in the circumferential direction, which has a positive effect on the load-bearing capacity of the ball socket 3.

In the example embodiment illustrated, between the ball bearing section 14 and the anti-rotation means 7 an annular recess (or depression) 16 is formed, in which a correspondingly shaped annular ridge 17 of the housing 2 engages. In cross-section the depression 16 is essentially U-shaped. In this case the annular ridge 17 of the housing 2 is formed on the side of the contact surface 18 that faces toward the ball bearing section 14, so that the ball bearing section 14 can be supported against it. For example, if the shank 5 is pivoted in the direction of the arrow 19, then depending on the friction forces inside the joint 1 a force acts upon the ball bearing section 14 in the direction of the anti-rotation means 7 and the ball bearing section 14 can be supported against the contact surface 18 of the housing 2 positioned there.

Figure 2A:
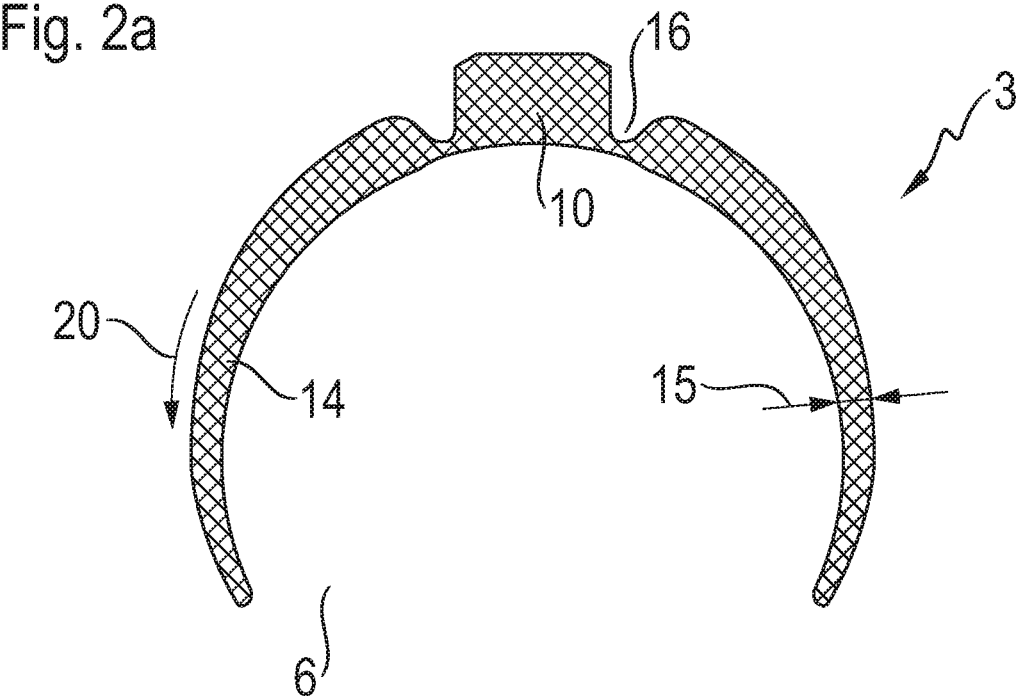
FIGS. 2a, 2b: Cross-sectional representations of a ball socket.
Figure 2B:
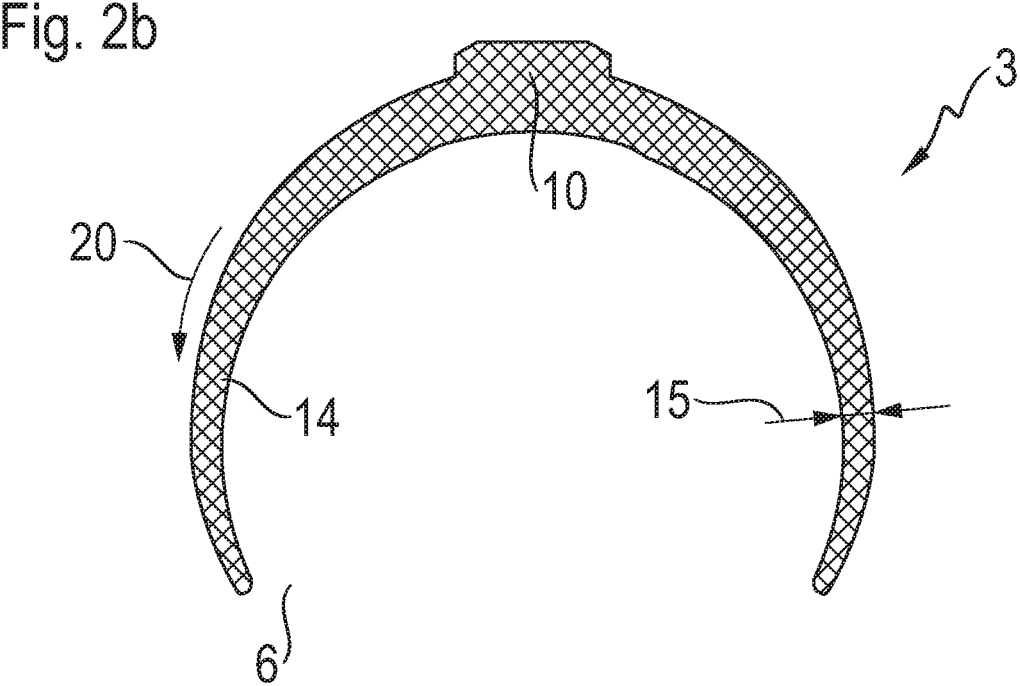

FIGS. 2a and 2b shows, respectively, cross-sectional representations of the ball socket 3, such that the embodiment according to FIG. 2a has a recess 16 between the ball bearing section 14 and the connecting element 10, whereas the embodiment according to FIG. 2b has no recess between the ball bearing section 14 and the connecting element 10. Regardless of this, in both cases it is provided that the wall thickness 15 of the ball bearing section 14 continuously decreases from the connecting element 10 in the direction toward the joint aperture 6, i.e. in the direction of the arrow 20.

FIG. 3a shows a perspective view of the ball socket 3 according to FIG. 2a, wherein the ball socket 3 is represented in its not-yet-assembled condition. According to this, from the equator 21 to the joint aperture 6 there extends an essentially cylindrical section 22 which allows the joint ball 4 (not shown in FIG. 3a) to be inserted into the ball socket 3. Then the ball socket 3 is inserted into the housing 2, as is shown in perspective in FIG. 3b. In the assembled condition (see FIG. 1) an annular element 23 is then pressed onto the cylindrical section 22 of the ball socket 3, so that the ball socket 3 makes contact with the head 4 of the joint. Finally, the annular element 23 is inserted into the housing 2 far enough for detent connections 24 to hold the annular element 23 and therefore the ball socket 3 within the housing 2 in an interlocked manner.

INDEXES

1 Ball joint
2 Housing
3 Ball socket
4 Joint ball
5 Shank
6 Joint aperture
7 Anti-rotation means
8 Central longitudinal axis
9 Plane
10 Connecting element on the ball socket
11 Connecting element of the housing
12 Holding profile of the ball socket
13 Holding profile of the housing
14 Ball bearing section
15 Wall thickness
16 Recess
17 Ridge
18 Contact surface
19 Direction of arrow
20 Direction of arrow
21 Equator
22 Cylindrical section of the ball socket
23 Annular element
24 Detent connection
α Cone angle
M Mid-point of the ball socket

The invention claimed is:

1. A ball joint comprising:
a housing,
a ball socket having a ball bearing section for receiving a joint ball,
an anti-rotation means for preventing any movement of the ball socket within the housing,
the housing and the ball socket each having a respective connecting element, which have corresponding holding profiles, that form the anti-rotation means so that, in an assembled condition of the housing and the ball socket, the connecting elements form a plug-in connection, and
a recess is formed, in an outside of the ball socket, which completely surrounds the connecting element of the ball socket and in which, in the assembled condition, the housing engages with a correspondingly shaped annular ridge, and the recess has a U-shaped cross-section.

2. The ball joint according to claim 1, wherein the ball bearing section completely surrounds the connecting element of the ball socket, and the connecting element is arranged around a central longitudinal axis of the ball joint.

3. The ball joint according to claim 1, wherein the connecting element of the ball socket, relative to a geometrical mid-point of the ball joint, is within a cone angle and the ball bearing section is outside the cone angle.

4. The ball joint according to claim 1, wherein the ball bearing section is formed rotationally symmetrically, relative to a central longitudinal axis of the ball joint, so that the ball bearing section is designed without any slot and without any groove.

5. The ball joint according to claim 1, wherein the connecting element of the ball socket is designed as a positive shape and the connecting element of the housing is designed as a negative shape.

6. The ball joint according to claim 1, wherein the corresponding holding profiles of the connecting elements are
in a form of hexagon or a six-point rounded star, or
have a slot-shape, a cross-shape or a polygonal shape in cross-section.

7. The ball joint according to claim 1, wherein the annular ridge of the housing is formed, as a contact surface, on a side facing toward the ball bearing section.

8. The ball joint according to claim 1, wherein the ball bearing section has, from the connecting element of the ball socket to a joint aperture of the ball joint, a smoothly decreasing wall thickness.

9. The ball joint according to claim 1, wherein the ball bearing section has, from the recess to a joint aperture of the ball joint, a smoothly decreasing wall thickness.

10. The ball joint according to claim 1, wherein the ball socket, before assembly, is of quasi-cylindrical shape from an aperture area to an equator so that the joint ball is insertable into the ball socket.

11. The ball joint according to claim 10, wherein an annular closing element which, in the assembled condition, deforms a cylindrical portion of the ball socket in such a manner that the ball socket surrounds the joint ball in a shape-enclosing manner.

12. A chassis ball joint comprising:
a housing and a ball socket having a ball bearing section which receives a joint ball;
an anti-rotation means for preventing movement of the ball socket within the housing;
the anti-rotation means being formed by a connecting element of the housing and a connecting element of the ball socket, and the connecting elements of the housing and the ball socket having complementary holding profiles such that, in an assembled condition, the connecting elements of the housing and the ball socket are connected together in a form-fitting manner, and
a recess is formed, in an outside of the ball socket, which completely surrounds the connecting element of the ball socket and in which, in the assembled condition, the housing engages with a correspondingly shaped annular ridge, and the recess has a U-shaped cross-section.

* * * * *